March 18, 1969    C. A. SPEAS ET AL    3,433,867
METHOD OF FORMING MOLD FOR DUAL-CHAMBERED CONTAINER PARTITION
Original Filed March 24, 1965
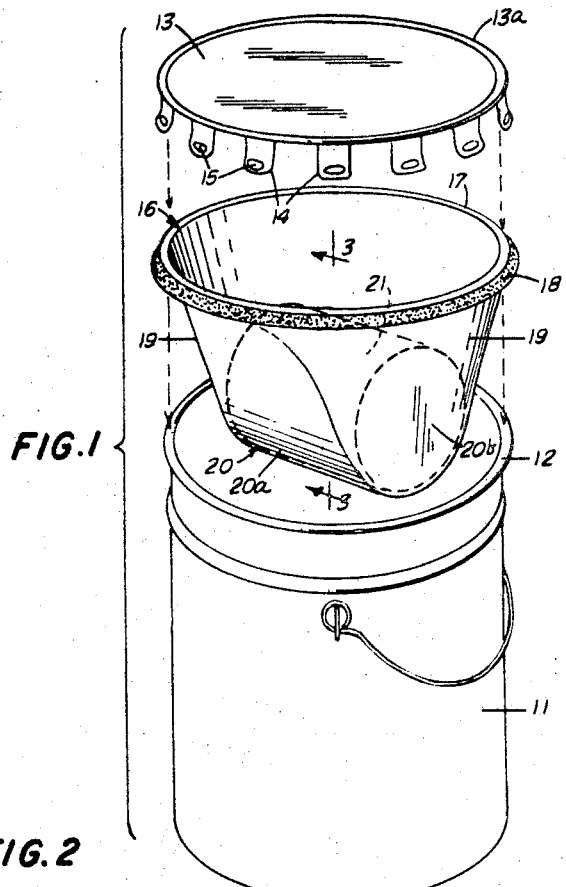
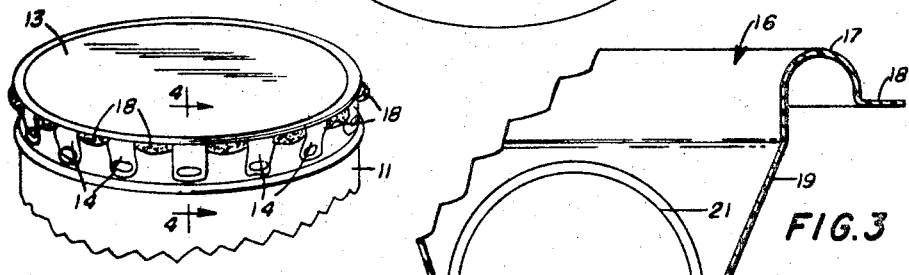
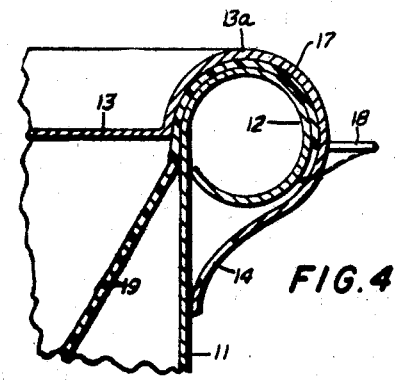
INVENTORS
CHARLES A. SPEAS
CHARLES T. JORDAN
BY Raphael Semmes
ATTORNEY INVENTORS
CHARLES A. SPEAS
CHARLES T. JORDAN
BY Raphael Semmes
ATTORNEY March 18, 1969 C. A. SPEAS ET AL 3,433,867
METHOD OF FORMING MOLD FOR DUAL-CHAMBERED CONTAINER PARTITION
Original Filed March 24, 1965 Sheet 3 of 3

INVENTORS
CHARLES A. SPEAS
CHARLES T. JORDAN
BY Raphael Semmes
ATTORNEY

United States Patent Office 3,433,867
Patented Mar. 18, 1969

3,433,867
METHOD OF FORMING MOLD FOR DUAL-CHAMBERED CONTAINER PARTITION
Charles A. Speas, Towson, and Charles T. Jordan, Baltimore, Md., assignors to Hedwin Corporation, New York, N.Y., a corporation of Maryland
Original application Mar. 24, 1965, Ser. No. 442,410, now Patent No. 3,351,225, dated Nov. 7, 1967. Divided and this application Mar. 14, 1967, Ser. No. 623,036
U.S. Cl. 264—225          6 Claims
Int. Cl. B29c 1/02

ABSTRACT OF THE DISCLOSURE

A method of producing a mold for use in performing a contoured thermoplastic diaphragm, comprising stretching a thin rubber membrane over a supporting frame and depressing in said membrane an article of the shape to be molded. A liquid material having hardening properties is applied to the underside of the depressed membrane and permitted to harden and produce a shell. The article is then removed from the depressed membrane and a mold-forming material is introduced into the shell and permitted to harden. Thereafter, the hardened mold-forming material is removed from the shell, resulting in the production of positive and negative patterns for the mold.

---

This application is a division of application Ser. No. 442,410, filed Mar. 24, 1965 now Patent No. 3,351,225, covering a Partition for Dual-Chambered Container.

This invention relates to containers or drums of the type wherein a supplemental chamber is provided within the main container for storing or shipping a plurality of chemically reactive or mixable materials in a separate and unmixed condition. More particularly, the invention consists in new and useful improvements in a dual chambered container including a partition designed to serve the purpose of sealing the drum between its rim and cover, and also to define the wall of an auxiliary chamber in the main container.

Heretofore, various arrangements have been devised for storing and shipping a plurality of separate ingredients in a common container for subsequent mixing, but these have been subject to certain objectionable features, either from the standpoint of cost or satisfactory performance. For example, a "piggy-back" arrangement of a plurality of pails or drums has been used, wherein one pail is superimposed upon another and acts as a closure for the latter with a separate closure for the superimposed pail. This, of course, is objectionable from the standpoint of cost, and, also, the time consumed and inconvenience in opening of the two containers for mixing.

Another conventional structure comprises a dished metal tray overhanging the rolled edge or lip of the drum beneath the closure and in which a separate can of an ingredient to be mixed with the content of the drum may be deposited. This arrangement is also objectionable in that the metal tray is subject to corrosion from the liquid in the main chamber of the container, and, also, a separate gasket is required in order to seal the lip of the container.

In some instances, a separate container is simply floated in the basic contents of a main container for subsequent mixing. This, however, is obviously objectionable because of the messiness involved, and, also, the screw cap which usually closes the separate container has a tendency to loosen, especially when the separate container is merely floating and not tied down in some way.

It is the primary object of the present invention to provide a preformed semi-rigid partition or diaphragm of thermoplastic material, the boundary of which is permanently contoured in cross-section to conform with and closely embrace the upper rim or lip of a container to form a seal between the latter and its closure, and wherein the diaphragm defines a concave partition depending within the container and providing the wall of an auxiliary chamber adapted to be covered by the main container closure.

Another object of the invention is to provide a partition of this nature which is permanently contoured to complement and relatively closely embrace the adjacent area of a separate container inserted therein to thereby prevent undue shifting during shipment.

Still another object of the invention is to provide a semi-rigid partition for a dual chambered container which is premolded or thermoformed in a special design which insures that there will be a minimum of bending stresses in the wall of the partition, and wherein the bounding edge of the partition conforms to and overhangs the lip of the container, thus not only securing the partition mechanically, but serving the added purpose of providing a liquid tight seal when the container is closed.

A further object of the invention is to provide a partition of the type described including a bounding flange which may be selectively colored for purposes of identification, said flange being visible when the container is in closed condition.

A still further object of the invention is to provide a new and improved method of forming molds for use in preforming partitions for dual chambered containers of the type above referred to.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 1 is an exploded perspective view of a container and the preferred form of partition, and including the drum closure;

FIG. 2 is a fragmentary perspective view of the upper portion of the drum in closed condition;

FIG. 3 is an enlarged fragmentary sectional view taken on line 3—3 of FIG. 1;

FIG. 4 is a similar view taken on line 4—4 of FIG. 2;

Figure 5:
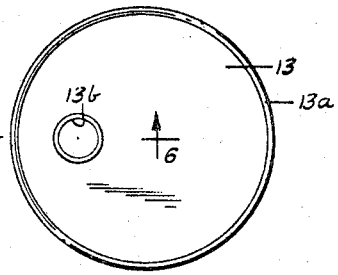
FIG. 5 is a top plan view of a modified structure.

In the preferred form of the invention as illustrated in FIG. 1, the partition or diaphragm is specially molded and preshaped from semi-rigid thermoplastic material in a design to at least partially complement the engaging areas of an inserted separate can containing an ingredient to be mixed with the bulk material in the main container. The container 11 is of conventional cylindrical form having a rolled upper rim or lip 12 over which the usual closure 13 is adapted to fit. The closure is of the conventional type provided with a plurality of annularly spaced, downwardly projecting lugs 14 adapted to be bent inwardly against the outer wall of the container and coacting with the rim 12 to prevent displacement. These lugs 14 are usually provided with apertures 15 to facilitate their outward bending by the use of a suitable instrument when the closure 13 is removed.

The partition, generally indicated by the numeral 16, is preferably formed of a semi-rigid thermoplastic material, such as polyethylene, which has been preformed in a manner hereinafter described to provide the bounding sealing flange and walls of a concave auxiliary chamber suspended in the main container. As best seen in FIG. 3, the bounding edge of this semi-rigid partition is precisely preformed to provide a continuous annular sealing and supporting ridge 17 which is arcuate in cross-section and contoured substantially complementary to the rolled rim 12 of container 11. The outer radial extremity of the ridge 17 terminates in a projecting flange 18 which may be distinctly colored as shown in FIG. 1 for purposes of identification, as hereinafter described.

The concave walls of the partition 16 converge from the inner boundary of the ridge 17, as at 19, and terminate in a cradle area 20 which is molded or otherwise preformed to substantially complement the adjacent surfaces of a separate can or container 21 which is filled with an ingredient to be later mixed with the bulk material in the main chamber of the container 11. The molded shape of the cradle area 20 may take various forms, depending upon the shape of the separate container 21. For example, the separate container may be in the form of a bottle, a long cylindrical can, a short thick cylindrical can, or any other configuration. In the form shown in FIG. 1, this cradle area is designed for a conventional cylindrical can, and the areas of the cradle adjacent the engaging portion of the peripheral wall of the can 21 conform substantially to the shape of these peripheral walls as at 20a, and the areas adjacent the two ends of the can are shaped to complement these ends as at 20b. Thus the can 21 is prevented from shifting either laterally or longitudinally by engagement with the preformed cradle 20.

As previously stated, the arcuate ridge 17 serves the dual purpose of supporting the partition and the weight of a separate can suspended therein, and also acts as a seal between the closure 13 and the annular lip or rim of the container. In order to adequately support this weight, the outer dimension of the rim should be sufficient to provide for an optimum area of actual overlying engagement with the lip 12 so that when engaged by the lugs 14 of the closure 13 there will be sufficient plastic material to firmly grip the lip. Otherwise, the partition is likely to drop into the main container under the impact weight of the inserted can 21 if the container is dropped on its bottom surface. Also, from the standpoint of its sealing function, it is important that the plastic material forming the ridge 17 be sufficiently thin for accommodation between the closure 13 and the rim 12 of the container. It has been found that a thickness of less than .030 inch is advisable in the ridge area, as with a thickness greater than this the closure will not fit onto the top of the container. To insure a tight seal, the under surface of the ridge 17 which engages the rolled lip of the container must be molded accurately, and the outer surface must be at least smooth.

When the closure 13 is secured in place with its lip 13a overlying the ridge 17 of the partition and lugs 14 bent in locking position as shown in FIG. 2, it will be seen that the areas of the flange 18 between the spaced lugs 14 protrude radially and are visible all around the container. As previously stated, this flange 18 may be selectively colored to provide an easy means for identifying not only the presence of a partition, but by using different colors this could serve as a means for identifying the particular contents in the separate can 21 to avoid having to remove the container lid 13.

The present invention thus provides a practical and efficient partition means for defining in a conventional drum or container a dual chambered arrangement wherein a separate can of a mixing ingredient can be cradled in the upper chamber of the container with adequate support at a minimum of displacement. The partition being preformed of a semi-rigid thermoplastic material is designed to provide a maximum of support with a minimum of bending stresses in the plastic material. Most plastics, such as polyethylene, are best utilized mechanically when the wall of the object to be made therefrom, in this case the partition 16, is under uniform tension without bending stresses. It is a well known fact that bending stresses tend to distort this type of object which, for example, is used to support a metal can as described. If such distortions and high stresses due to bending can be avoided, then the wall of the partition can be relatively thin, thereby utilizing to a maximum the mechanical strength of the plastic in the wall of the partition.

Furthermore, due to the characteristic of this thermoplastic material to seal itself to the rolled rim of the container, a very effective seal is provided, and the sealing flange or ridge additionally has added strength to support the weight of an inserted can in the partition.

Most thermoplastics are, if in contact with a surface active agent under certain conditions, subject to stress corrosion, usually referred to as environmental stress cracking or ESC. ESC susceptibility of a given thermoplastic among others also depends on inherent and applied stresses of the plastic material. It is thus obvious that a controlled method of forming these partitions, which results in a minimum of inherent and applied stresses, such as illustrated in the above-described optimum mechanical utilization and resulting uniform tension and complete absence of bending stresses will insure that any thermoplastics utilized as the raw material of these partitions, will show very low susceptibility to ESC when in contact with certain liquids in the main chamber of the container 11.

Figure 6:
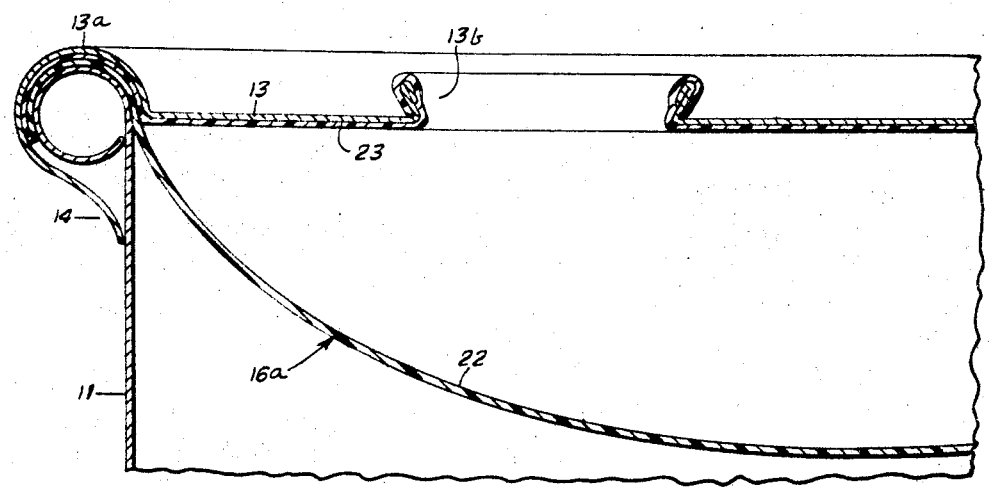
FIG. 6 is an enlarged fragmentary sectional view taken on line 6—6 FIG. 5.

The foregoing description relates primarily to the preferred form of the invention, but it will be obvious that various other forms embodying the same basic principle may be employed. For example, in FIGS. 5 and 6, there is shown a modified form of partition 16a which embodies a two-walled, self-closed auxiliary chamber. Here it will be seen that the auxiliary chamber comprises a concave bottom wall 22, the peripheral edges of which are permanently bonded to a horizontal top wall 23. Such a structure can be easily formed by conventional vacuum forming procedures or thermoformed by a process involving two sheets of thermoplastic material, either manufactured separately or together. In this modification, the auxiliary chamber directly contains the liquid or other ingredient to be mixed with the basic content of container 11, and the top wall 23 of the chamber and the closure 13 are provided with a common discharge opening 13b. Thus, when the closure 13 is removed, the auxiliary chamber is removed therewith, and the material in the latter is discharged through opening 13b into the main container.

Figure 7:
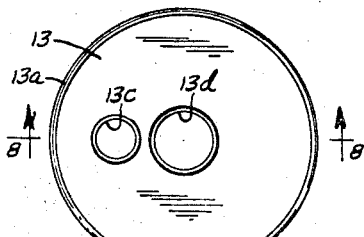
FIG. 7 is a top plan view of a further modification.
Figure 8:
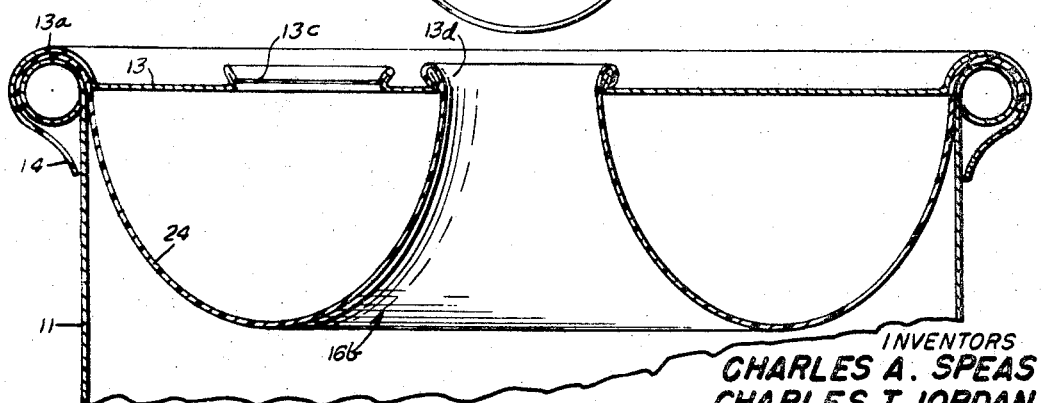
FIG. 8 is an enlarged sectional view taken on line 8—8 of FIG. 7.

A further modification is shown in FIGS. 7 and 8, and comprises an annular partition structure 16b of preformed, semi-rigid thermoplastic material having only a bottom wall 24. In this form, the container closure 13 is provided with two discharge openings 13c and 13d. The opening 13c is arranged adjacent one side of the annulus and opens into the latter, while the opening 13d communicates centrally with the contents of the main container. Aside from the preformed cradle area described in connection with the preferred form of the invention, both of the modifications just described embody the same sealing and support features, as well as the design to insure a minimum of bending stresses in the wall of the partition. In other words, in all forms of the invention, the partition and the contents thereof are supported directly on the rolled rim of the main container with pure tension stresses.

For many reasons, a partition of this nature for providing a dual chambered container is preferably formed of a semi-rigid plastic rather than metal. For metal, relatively high bending stresses are possible without the excessive use of material, but for plastics, the surface of the shell should be under tension and not under bending stresses to minimize the amount of material required. A dished metal tray which overhangs the edge of the container, such as earlier referred to, is far more subject to corrosion from the liquid in the container, and for certain applications, metal cannot be used. Thus, plastic is highly desirable in such a construction.

One of the features of the present invention resides in the method of manufacturing the molds for thermoplastic partitions of special design types, such for example, as shown in FIG. 1 wherein a separate container or can is suspended in a thermoformed partition fitting into the top of a main container. As previously indicated, the separate container may be in the form of a can, a bottle, or other contour, and containing an ingredient for subsequent admixture with the basic content of the main container.

Figure 9:
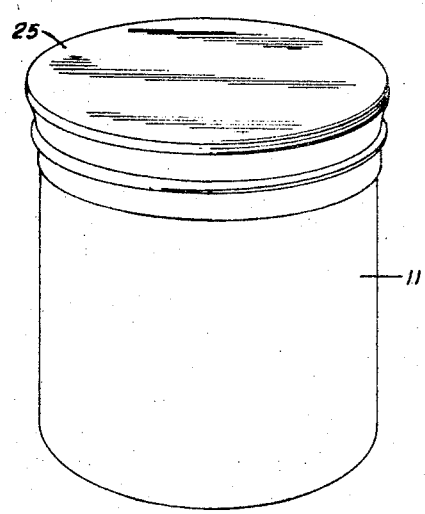
FIG. 9 is a perspective view of a container, illustrating the first step in the operation of forming the mold for the partition.
Figure 10:
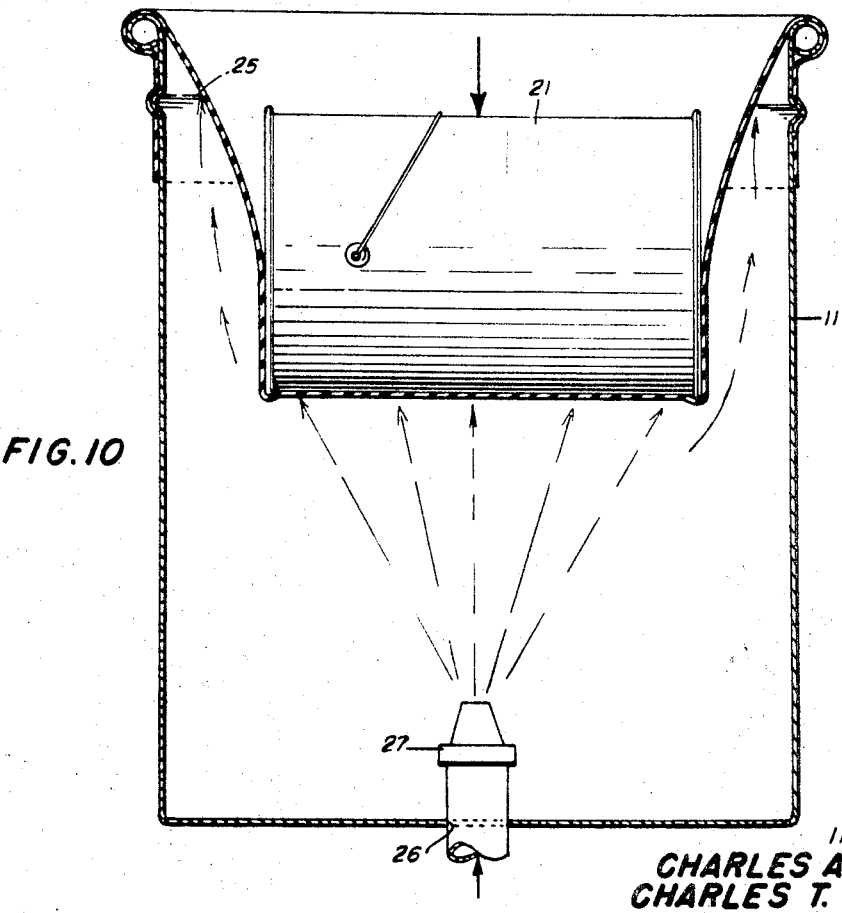
FIG. 10 is an enlarged sectional view illustrating the second step in the mold forming operation.

This method is illustrated in FIGS. 9 and 10 wherein a thin rubber membrane 25 is stretched over the top of a five-gallon drum 11, for example, which acts as a supporting frame, and the separate container 21 is pushed downwardly in the central portion of the membrane, as shown in FIG. 10. Thus, by using an object of the same shape as the separate container 21, with due allowance made for shrinkage in the plastic material, etc., the shape which the rubber membrane assumes is that which will be used as the final thermoformed shape.

With the separate container or object 21 held in this position with the rubber membrane 25 stretched around it and suspended over the top rim of the drum 11, the membrane assumes the same shape as the final thermoformed object in the areas of contact. By providing an excess hole 26 in the bottom of the container and inserting a spray nozzle 27, a suitable liquid material of a type which readily hardens in place can be sprayed or poured onto the formed rubber diaphragm in such a manner as to not deform the shape of the diaphragm. This hardening effect produces a shell which then has the shape of the final plastic object, and the shell can then be used as a receptacle for plaster or other conventional material used to define the shape of the mold for the purpose of casting or other standard techniques of mold forming. Thus, a positive and negative pattern is achieved.

It should be pointed out that the invention performs this method of forming patterns by defining the optimum shape without resorting to complicated design or design definition. One of the problems of defining a complicated thermoformed shape is to draw it in such a manner that the craftsman can proceed to reproduce it in the form of patterns, and, subsequently, molds. This involves considerable effort in drawing complicated cross-sectional views, and, often, errors are made in interpretation of the drawing. These mistakes can be both time-consuming and costly, in addition to the fact that the original design may not have been optimum in the first place.

It should also be noted that one of the fundamentals of this method of manufacturing molds is that the thin rubber membrane is incapable of exerting bending stresses in its surface. Thus, a shape is achieved in the thin rubber membrane which is free of bending stresses, and all points of the thin rubber membrane are, for all practical purposes, exclusively under tensile stress. As previously pointed out, this is an important feature of the ultimate thermoplastic partition.

In the foregoing description, reference has been made to semi-rigid, thermoplastic materials and particularly polyethylene for purposes of illustration. However, it will be understood that other thermoplastic materials, some of which are considered rigid, may be employed with satisfactory results. For example, high-density polyethylene, polypropylene, etc. may be used.

Therefore, in the following claims, where the term "at least semi-rigid thermoplastic material" is employed, such term is intended to include not only polyethylene but also other polyolefins such as polypropylene, ethylene-butene, ethylene-propylene, ethylene-vinyl acetate copolymers, polyethylene-polyisobutylene and similar blends (which are also commercialized under the broader designation of polyethylene), as well as other thermoplastic materials.

The primary feature of the invention embodies the disclosed principle of molding objects free of bend stresses by forming a mold with the aid of an object having a contour substantially identical with the object it is intended to support. By the use of the invention, the resulting diaphragm provides resistance to bending and resistance to environment stress cracking, far superior to any produced by conventional methods.

From the foregoing, it is believed that the invention may be readily understood by those skilled in the art without further description, it being borne in mind that numerous changes may be made in the details disclosed without departing from the spirit of the invention as set forth in the following claims.

We claim:
1. The method of producing a mold for use in preforming a contoured diaphragm comprising the steps of stretching a thin, flexible, rubber membrane over a continuous open frame member, depressing in said membrane an article of the shape to be molded, applying to the underside of said depressed membrane a liquid material having hardening properties, permitting said liquid material to harden and produce a shell, and removing said article and said membrane from said shell.

2. The method of producing a mold for use in preforming a contoured diaphragm comprising the steps of stretching a thin, flexible, rubber membrane over a continuous open frame member, depressing in said membrane an article of the shape to be molded, applying to the underside of said depressed membrane a liquid material having hardening properties, permitting said liquid material to harden and produce a shell, removing said article and said membrane from said shell, introducing a mold-forming material into said shell and permitting said mold-forming material to harden and form a mold member, whereby a complete mold substantially of the shape of said article is produced.

3. A method according to claim 1, in which the frame member comprises the upper rim of an open container.

4. A method according to claim 1, in which said membrane is depressed by differential air pressure.

5. A method according to claim 1, wherein the material applied to the underside of said diaphragm is applied by spraying.

6. A method according to claim 1, wherein the material applied to the underside of said diaphragm is applied by pouring.

References Cited

UNITED STATES PATENTS

| | | | |
|---|---|---|---|
| 3,140,325 | 7/1964 | Graff | 264—316 X |
| 2,958,148 | 11/1960 | Sylvester | 264—220 X |
| 2,805,787 | 9/1957 | Sherman | 264—313 X |

JULIUS FROME, *Primary Examiner.*

T. MORRIS, *Assistant Examiner.*

U.S. Cl. X.R.

264—316